US008464951B2

(12) United States Patent
Trajkovic et al.

(10) Patent No.: US 8,464,951 B2
(45) Date of Patent: Jun. 18, 2013

(54) METHOD AND APPARATUS FOR MONITORING AN EXIT WINDOW OF A SCANNER

(75) Inventors: Miroslav Trajkovic, Centereach, NY (US); Jade Zhang, Selden, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/608,630

(22) Filed: Oct. 29, 2009

(65) Prior Publication Data

US 2011/0101099 A1 May 5, 2011

(51) Int. Cl.
*G06K 7/10* (2006.01)

(52) U.S. Cl.
USPC ............ 235/454; 235/437; 235/459; 235/461

(58) Field of Classification Search
USPC ............... 235/454, 462, 472, 462.11, 462.17, 235/462.32, 462.41, 461, 459, 437
See application file for complete search history.

(56) References Cited

U.S. PATENT DOCUMENTS

| 5,440,142 | A | * | 8/1995 | Maddox | 250/566 |
| 6,726,094 | B1 | * | 4/2004 | Rantze et al. | 235/379 |
| 2006/0043194 | A1 | * | 3/2006 | Barkan et al. | 235/462.45 |
| 2006/0268377 | A1 | | 11/2006 | Haas et al. | |
| 2007/0211311 | A1 | | 9/2007 | Korhonen et al. | |
| 2008/0023560 | A1 | * | 1/2008 | He et al. | 235/462.42 |
| 2010/0147953 | A1 | * | 6/2010 | Barkan | 235/462.41 |

OTHER PUBLICATIONS

International Search Report and Written Opinion for counterpart International Patent Application No. PCT/US2010/049995 mailed on Dec. 1, 2010.
International Preliminary Report on Patentability and Written Opinion for counterpart International Patent Application No. PCT/US2010/049995 issued on May 1, 2012.

* cited by examiner

*Primary Examiner* — Michael G Lee
*Assistant Examiner* — Tabitha Chedekel
(74) *Attorney, Agent, or Firm* — Nong-Qiang Fan

(57) ABSTRACT

A method, system, and apparatus for monitoring an exit window of a scanner using a plurality of imaging devices. The method includes capturing a first image through the exit window using a first imaging device, capturing a second image through the exit window using a second different imaging device, and detecting at least one of a plurality of features in both the first and second images. The method further includes matching the plurality of features detected in both the first and the second images, determining whether the at least one matched feature is present on the plane of the exit window, and monitoring a physical condition of the exit window based on the at least one feature.

11 Claims, 3 Drawing Sheets

METHOD AND APPARATUS FOR MONITORING AN EXIT WINDOW OF A SCANNER

FIELD OF THE DISCLOSURE

The present disclosure relates generally to optic scanners and more particularly to a method and apparatus for monitoring an exit window of a scanner.

BACKGROUND

Various electro-optical systems have been developed for reading optical indicia, such as barcodes. The barcode comprises a series of bars and spaces of varying widths and having differing light reflecting characteristics. Barcodes may be one dimensional (1D), i.e., a single row of graphical indicia such as a UPC barcode or two dimensional (2D), i.e., multiple rows of graphical indicia comprising a single barcode such as a PDF 417 barcode. Barcodes and are usually present on a label attached to an object.

Systems that read barcodes called barcode readers electro-optically transform the graphic indicia into electrical signals and then decode the electric signals into alphanumerical characters that are intended to be descriptive of the article or some characteristic thereof.

There are different types of barcode readers or scanners. The types include such as, but not limited to, pen or wand-type readers, handheld readers, and fix-mount readers such as, horizontal slot readers, vertical slot readers, and readers that have both horizontal and vertical slots, such as a bi-optic scanner. Also, there are different ways of using the readers to read a barcode. In the case of pen or wand-type readers an operator has to swipe the pen over the label in order to read the barcode. In the case of handheld readers the operator need not swipe the reader over the label, but must at least position the reader near the label. In the case of fix-mount readers or scanners, the reading is performed by laterally passing the object, containing the label, over the scanner's window (exit window). However, in some places like checkout counters of super markets where fix-mount scanners such as bi-optic scanners are used, items are often swiped across the exit window during check out. The items can be quite heavy or dirty or wet. Also, since the exit windows are usually made of glass or other material similar to glass, it is quite likely that the exit window will get dirty, scratched or damaged. This can adversely affect the performance of the scanner.

Accordingly, there is a need for a method, a system, and an apparatus for monitoring an exit window of a scanner.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
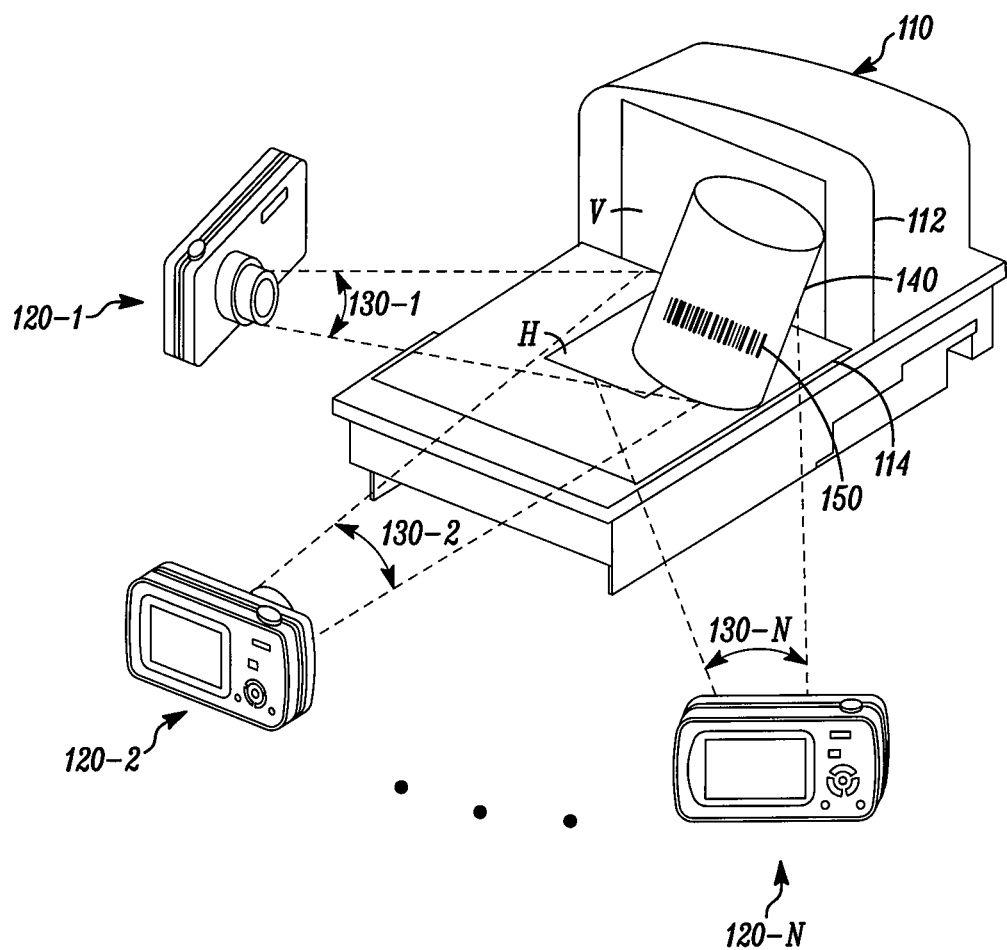
FIG. 1 is a block diagram of a system for monitoring an exit window in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention relates to a method, system, and device for monitoring an exit window of a scanner by using a plurality of imaging devices. The method includes capturing a first image through the exit window using a first imaging device and capturing a second image through the exit window using a second different imaging device, wherein the positions of the plurality of imaging devices and the plane of the exit window are known. The method further includes detecting at least one of a plurality of features in both the first and second images and matching the features detected in both the first and second images. Further, the method proceeds with determining whether at least one matched feature is present on the plane of the exit window and monitoring a physical condition of the exit window based on the at least one feature. Advantages of the various embodiments include: enabling a proper decoding of a barcode by monitoring the physical condition of the scanner's exit window and thereby indicating an operator whether the exit window has to be cleaned or replaced. Those skilled in the art will realize that the above recognized advantages and other advantages described herein are merely illustrative and are not meant to be a complete rendering of all of the advantages of the various embodiments.

Referring now to figures, FIG. 1 is a block diagram of a monitoring system 100 in accordance with some embodiments. The monitoring system 100 includes a bi-optic scanner 110 and a plurality of imaging devices 120-1, 120-2 . . . 120-n. The imaging devices 120-1, 120-2 . . . 120-n can include monitoring devices that are commonly used in stores or super markets such as cameras, video recorders, web cams, and any device capable of capturing an image through the exit window of the bi-optic scanner 110 and thereby enable monitoring the exit window of the scanner 110. The image captured through the exit window of the scanner 110 can include image of any object that is present in the near vicinity of the scanner 110 besides the image of the exit window. Otherwise, the captured image can include only the image of the exit window.

Referring back to FIG. 1, the bi-optic scanner 110 includes a horizontal window H set flush with, or recessed into, a countertop 114, and a vertical or generally vertical window V set flush with, or recessed into, a raised housing portion 112 above the countertop 114. The counter top 114 and the raised housing portion 112 can be placed perpendicular to each other or can be at any angle to each other, such that an object containing a barcode can be passed between the horizontal and the vertical windows (H and V) to enable reading of the barcode. The bi-optic scanner 110 also includes an imaging system (not shown) for capturing the image of the barcode 150 present on an object 140 that is been placed over or swiped across the scanner 110. The imaging system includes a plurality of cameras for capturing the image of the barcode 150. The cameras capture images through horizontal and the vertical windows (H and V) and therefore can be used for monitoring the physical condition of the horizontal and the vertical (H and V) windows. The bi-optic scanner 110 can also include a decoding system (not shown) including a processor for decoding the image of the barcode 150 and therefore, obtaining the data represented by the barcode 150. In one embodiment, the imaging system and decoding system of the bi-optic scanner 110 can also be used to monitor the exit window of the scanner.

Referring back to FIG. 1, the plurality of imaging devices 120-1, 120-2 . . . 120-n are located external to the scanner 110 and are positioned such that at any point of time, the exit windows V and H are in the field of view (FOV) 130-1, 130-2 . . . 130-n of at least two of the plurality of imaging devices. The positioning also enables the imaging devices 120-1, 120-2 . . . 120-n to capture an image through the horizontal window H or through the vertical window V of the bi-optic scanner and thereby detect any dirt or defect present on the plane of the window. In order to enable the detection, the location of the imaging devices 120-1, 120-2 . . . 120-n and the scanner 110 are known prior to the capturing of the images. Further, the imaging devices 120-1, 120-2 . . . 120-n can be coupled to an external processor (not shown) in order to process the captured images. Otherwise, the imaging devices 120-1, 120-2 . . . 120-n can be equipped with at least a processor (not shown) and any additional component as needed for a commercial embodiment.

The teachings herein, however, are not limited to a bi-optic scanner but can be applied to other types of scanners having an exit window. In addition, only a single bi-optic scanner is shown for ease of illustration. However, the teachings herein can be implemented within a system comprising any number of bi-optic scanners that are monitored by a plurality of imaging devices.

Figure 2:
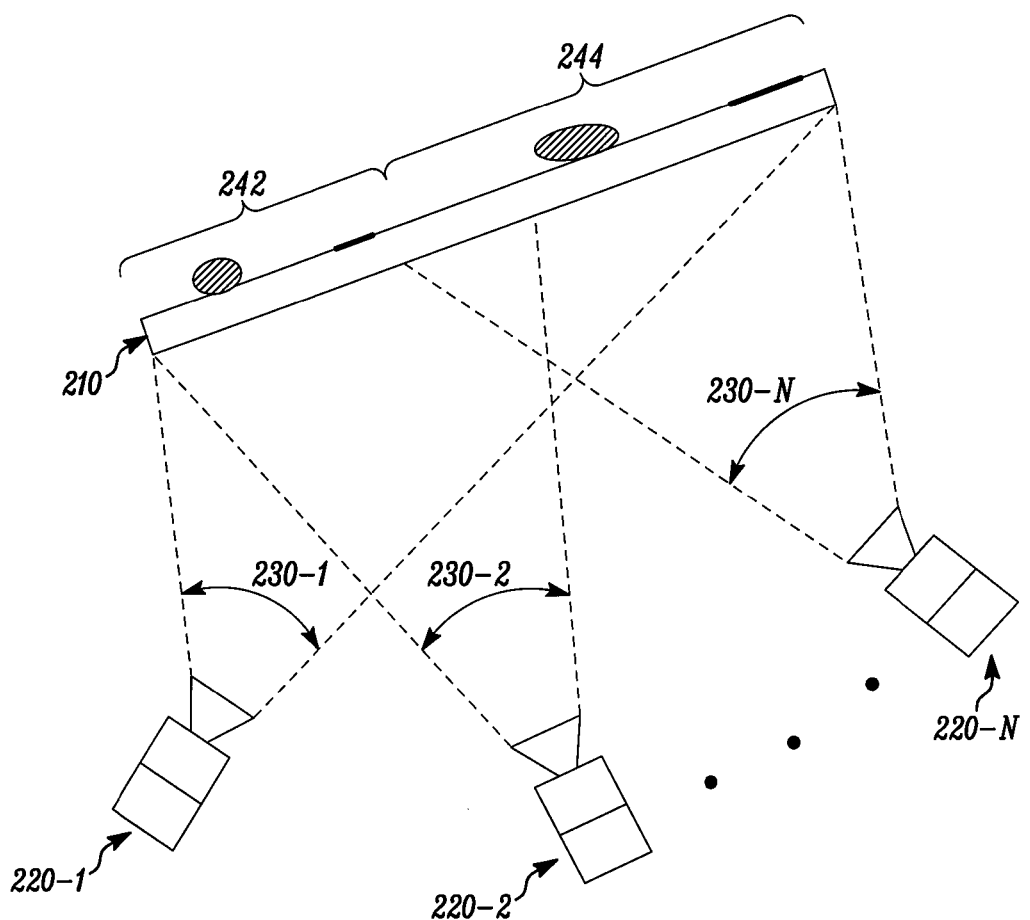
FIG. 2 is a schematic of a monitoring system in accordance with some embodiments.

FIG. 2 is a schematic of a monitoring system 100 in accordance with some embodiments. The schematic 200 illustrates a plane 210 of the exit window of the scanner 110 under a field of view (FOV) 230-1, 230-2 . . . 230-n of the imaging devices 220-1, 220-2 . . . 220-n, respectively. The imaging devices 220-1, 220-2 . . . 220-n correspond to the imaging devices 120-1, 120-2 . . . 120-n and the FOVs 230-1, 230-2 . . . 230-n correspond to FOVs 130-1, 130-2 . . . 130-n, shown in FIG. 1. In one embodiment, the plane 210 is the plane of the horizontal window H. In another embodiment, the plane 210 is the plane of the vertical window V. The areas of interest 242 and 244 present on the plane 210 of the exit window represent a dirt or scratch that has occurred due to swiping a wet or a heavy object across the exit window V or H. The method of capturing an image of the exit window and thereby detecting the areas of interest 242 and 244 are further explained in detail below with reference to FIG. 3

Figure 3:
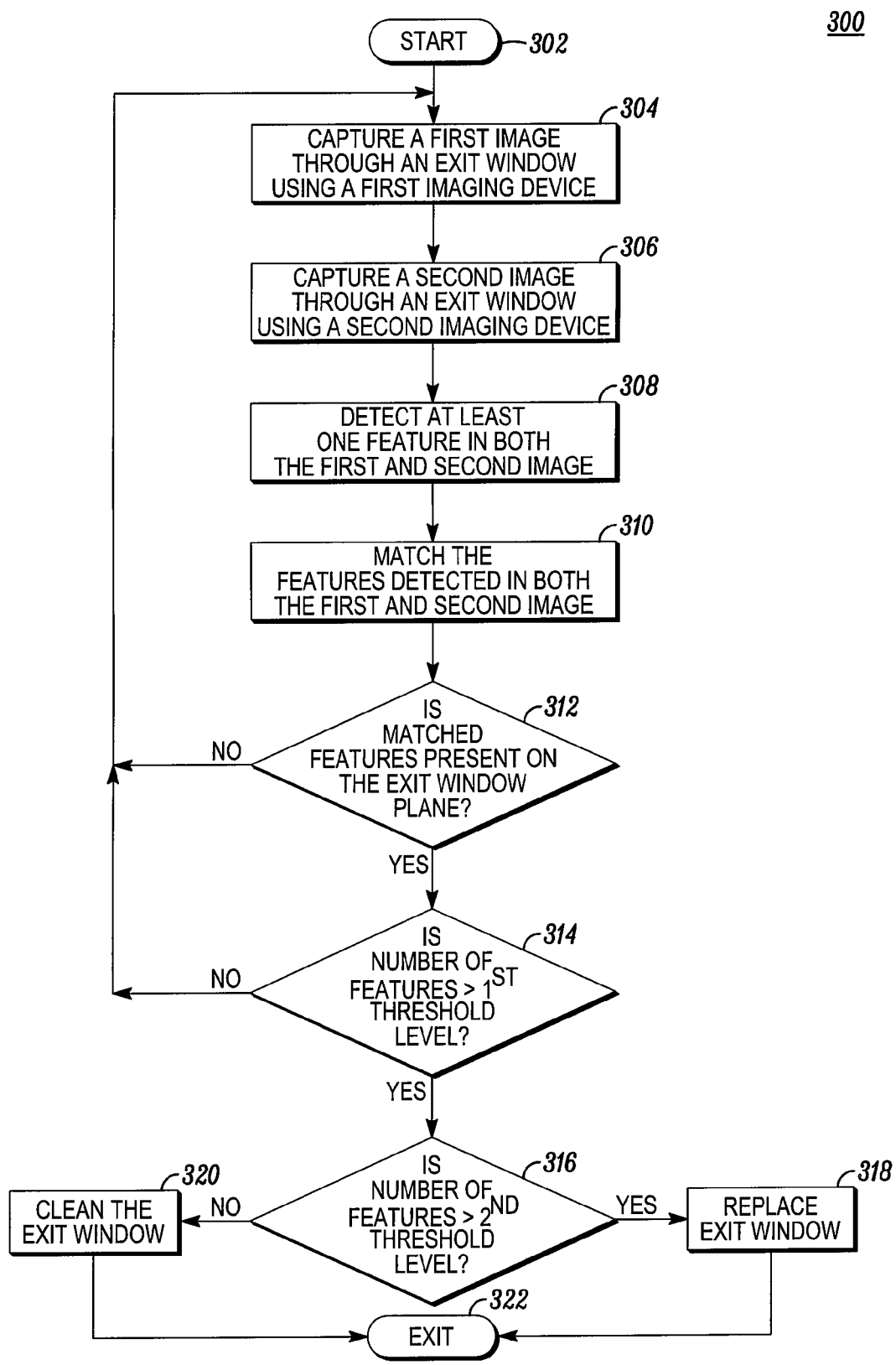
FIG. 3 is a flowchart of a method for monitoring an exit window in accordance with some embodiments.

FIG. 3 is a flowchart of a method for monitoring an exit window of a scanner in accordance with some embodiments. The method 300 can be implemented in any processor that is coupled to the imaging devices 120-1, 120-2 . . . 120-n or any processor embedded within the imaging devices. The method 300 can be initiated when the system 100 is in an idle state, i.e., when the system is not decoding a barcode. However, the method 300 is not limited to an idle state but can also be initiated when decoding of a barcode takes place.

Upon initiating 302 the monitoring system 100, the method 300 proceeds with capturing 304 a first image through an exit window V or H of the scanner 110 by using a first imaging device (one of 120-1, 120-2 . . . 120-n) followed by capturing 306 a second image through an exit window V or H of the scanner 110 by using a second imaging device (one of 120-1, 120-2 . . . 120-n). The first and the second image are captured using two different imaging devices. The method 300 continues with detecting 308 at least one feature such as, but not limited to a dirt or scratch, present on the captured images. The method 300 further includes matching 310 the features that were detected in both the images and determining 312 whether the matched features are present on the plane 210 of the exit window V or H. The matching and determination can be done using stereo matching technique or any other technique already known in the art. After determining 312 that the matched features are present on the plane 210 of the exit window, the method 300 proceeds with comparing the matched features with different threshold levels. These threshold levels can be defined by an operator and can be programmed into the processor. On the other hand, if the matched feature is not present on the exit window plane 210 then the method 300 continues with image capturing 304.

Turning back to FIG. 3, after determining 312 that the matched features are present on the plane 210 of the exit window V or H, in one embodiment the method 300 compares 314 the number of the matched features for example the number of scratches present on the exit window plane 210 with a first threshold level. If the number of features present on the exit window plane 210 is less than the first threshold level the method 300 proceeds with image capturing 304. On the other hand, if the number of features present on the exit window plane 210 are greater than the first threshold level the method 300 proceeds with comparing 316 the number of features with a second threshold level. If the number of features present on the exit window plane 210 is greater than the first threshold level and less than the second threshold level, an indication to clean 320 the scanner window V or H is sent to the operator of the scanner 110 and the method ends at 322. On the other hand, if the number of features present on the exit window plane 210 exceeds both the first and the second threshold levels, then an indication to replace 318 the exit window is sent to the operator and the method ends at 322. The indication can be an audio indication through a speaker or any audio device, a visual indication through LED, LCD, monitor, or any display device, or an audio visual indication. In one embodiment, the first and second threshold levels are chosen such that the second threshold level is greater than the first threshold level. However, the threshold levels can be defined and chosen in any order based on a system requirement and the conditions used for comparison.

Referring back to the method 300, after determining 312 that the matched features are present on the exit window plane 210, in another embodiment of the method 300, an area of the matched feature, for example an area occupied by a dirt or scratch, is compared with different threshold levels in a similar manner as mentioned above. For example, the area occupied by the matched feature is compared with a first threshold level. If the area occupied by the matched feature is less than the first threshold level the method 300 proceeds with image capturing 304. On the other hand, if the area occupied is greater than the first threshold level the method 300 proceeds with comparing the area with a second threshold level. If the area occupied by a matched feature is greater than the first threshold level and less than the second threshold level, an indication to clean 320 the scanner window V or H is sent to the operator of the scanner 110 and the method ends at 322. On the other hand, if the area occupied by the matched feature is greater than the first and the second threshold levels, then an indication to replace 318 the exit window is sent to the operator and the method ends at 322.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for monitoring an exit window of a scanner using a plurality of imaging devices located within the scanner, wherein position of the plurality of imaging devices and a plane of the exit window are known, the method comprising:
   capturing a first image of the exit window using a first imaging device;
   capturing a second image of the exit window using a second different imaging device;
   detecting at least one of a plurality of features adversely affecting the performance of the scanner, in both the first and second images;
   monitoring a physical condition of the exit window based on the at least one detected feature;
   matching the features detected in both the first and the second images;
   determining whether at least one matched feature is present on the exit window, wherein the at least one matched feature is present on the exit window when the distance between the at least one matched feature and the exit window is essentially zero; and
   sending an indication based on the determination.

2. The method of claim 1 further comprising:
   comparing the number of features present on the exit window plane with a first and second predetermined threshold levels;
   sending an indication to clean the exit window when the number exceeds a first predetermined threshold level and is below the second predetermined threshold level; and
   sending an indication to replace the exit window when the number exceeds both the first and second predetermined threshold levels.

3. The method of claim 1 further comprising:
   comparing an area occupied by the at least one of the plurality of features present on the exit window plane with a first and second predetermined threshold levels;
   sending an indication to clean the exit window when the area occupied exceeds a first predetermined threshold level and is below the second predetermined threshold level; and sending an indication to replace the exit window when the area occupied exceeds both the first and second predetermined threshold levels.

4. The method of claim 1 further comprising:
capturing the image of the exit window when the scanner is in an idle state.

5. The method of claim 1, wherein the exit window is in a field of view (FOV) of at least two of the plurality of imaging devices.

6. The method of claim 1, wherein the scanner is a bi-optic scanner, wherein the exit window is at least one of a horizontal exit window and a vertical exit window of the bi-optic scanner.

7. A system for monitoring an exit window of a scanner using a plurality of imaging devices located within the scanner, wherein location of the plurality of imaging devices and a plane of the exit window are known, the system comprising:
a scanner;
a plurality of imaging devices, wherein a first imaging device captures a first image of the exit window and a second different imaging device captures a second image of the exit window;
a processor coupled to the plurality of imaging devices, wherein the processor is configured to,
detect at least one of a plurality of features adversely affecting the performance of the scanner, in both the first and second images and monitor a physical condition of the exit window based on the at least one detected feature; and
match the features detected in both the first and the second images; and
determine whether at least one matched feature is present on the exit window, wherein the at least one matched feature is present on the exit window when the distance between the at least one matched feature and the exit window is essentially zero; and
send an indication based on the determination.

8. The system of claim 7, wherein the processor is further configured to:
compare a number of features on the exit window plane with a first and second predetermined threshold levels;
send an indication to clean the exit window when the number exceeds a first predetermined threshold level and is below the second predetermined threshold level; and
send an indication to replace the exit window when the number exceeds both the first and second predetermined threshold levels.

9. The system of claim 7, wherein the processor is further configured to:
compare an area occupied by the feature on the exit window plane with a first and second predetermined threshold levels;
send an indication to clean the exit window when the area occupied exceeds a first predetermined threshold level and is below the second predetermined threshold level; and
send an indication to replace the exit window when the area occupied exceeds both the first and second predetermined threshold levels.

10. The system of claim 7, wherein the exit window is in a field of view (FOV) of at least two of the plurality of imaging devices.

11. The system of claim 7, wherein the scanner is a bi-optic scanner, wherein the exit window is at least one of a horizontal exit window and a vertical exit window of the bi-optic scanner.

* * * * *